No. 715,295. Patented Dec. 9, 1902.
F. H. RICHARDS.
PLAYING BALL.
(Application filed Oct. 18, 1902.)
(No Model.)
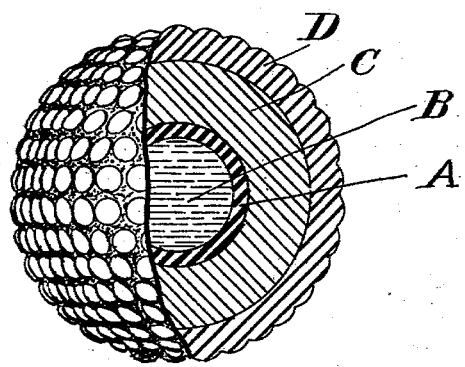
Witnesses:
J. E. Davidson
R. W. Pittman
Inventor:
F. H. Richards

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

PLAYING-BALL.

SPECIFICATION forming part of Letters Patent No. 715,295, dated December 9, 1902.

Application filed October 18, 1902. Serial No. 127,825. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention, relating to playing-balls, and especially to those adapted for the purposes of golf, has for its objects to increase the efficiency of the ball by increasing the mobility of the structure, so that the distortion of the interior of the ball produced by impact will not burst or otherwise affect the shell, and a further object is to attain the primary object by the use of a convenient method and cheap material.

In carrying out these objects I provide in a ball structure a fluid or liquid filled member which forms a cushion for the various components of the ball, so that the severe distortion to which the components are subjected by the impact imparted to the shell will be permitted displacement by the fluid or liquid filled member in the ball structure.

A drawing representing one form of the invention forms a part of this specification and discloses a ball partly broken away to show its construction.

In the present instance the fluid or liquid filled member comprises a receptacle A, which may be formed of any suitable material, preferably of a plastic nature, and in the present instance comprising a soft-rubber envelop which is filled with a suitable permanent fluid or liquid B—such, for instance, as water, glycerin, or other like material. Upon the center piece thus formed is applied a layer C, which may comprise a plastic shell—such as soft rubber, gutta-percha, or celluloid—or which may be built up of windings of approximately pure rubber, so as to form a solid core. The ball thus formed is incased in an outer shell D, of plastic material, such as celluloid or gutta-percha, which is applied thereto preferably in hemispherical segments and under heat and pressure, said shell being allowed to solidify and harden while the compression is maintained, when the inner components of the ball structure will then be held under compression.

Any suitable fluid or liquid may be used to form the filled member, and, if desired, this member may form a member of the ball structure other than the center piece; also, that other various modifications may be resorted to within the scope of this invention.

It will be seen that a ball having as one of its components a fluid or liquid filled member will possess a degree of mobility which will render the structure as a whole highly efficient, for the purposes of golf especially. It will be further noted that such a structure will preserve the life of a shell. It will also be seen that by the use of a permanent incompressible fluid a hard but springy and mobile member will be provided, and this member, in the present instance comprising the center piece, will lend to the other portions of the ball an anvil-like effect, which will permit the resilient forces of the structure to properly assert themselves when the shell receives a blow from the club.

Having thus described my invention, I claim—

1. A playing-ball a portion whereof comprises a member filled with a permanent incompressible liquid.

2. A playing-ball a portion whereof comprises a plastic member into which is forced a liquid.

3. A playing-ball having a plastic shell and within which is a member comprising a receptacle filled with liquid.

4. A playing-ball having a plastic shell and within which is a member comprising a plastic receptacle filled with liquid.

5. A playing-ball having a plastic shell and within which is a member comprising a soft-rubber receptacle filled with liquid.

6. A playing-ball having a gutta-percha shell within which is a member comprising a plastic receptacle filled with liquid.

7. A playing-ball having a center piece which comprises a member filled with liquid, a layer thereon, and a shell inclosing said ball.

8. A playing-ball having a center piece comprising a plastic receptacle filled with liquid, a plastic layer thereon, and a plastic shell.

9. A playing-ball having a center piece comprising a plastic receptacle filled with permanent incompressible fluid, a layer of plastic material thereon, and a shell of gutta-percha holding the ball under compression.

10. A playing-ball having a center piece comprising a receptacle containing fluid, of windings of tensioned rubber thereon, and a shell inclosing said windings.

11. A playing-ball having a center piece comprising a receptacle containing fluid, windings of tensioned rubber thereon, and a plastic shell.

12. A playing-ball having a center piece comprising a receptacle containing fluid, windings of tensioned rubber thereon, and a gutta-percha shell.

13. A playing-ball having a center piece comprising a member containing a permanent incompressible fluid, windings of approximately pure rubber thereon, and a shell of plastic material.

14. A playing-ball having a center piece comprising a member containing a permanent incompressible fluid, windings of approximately pure rubber thereon and forming a solid core, and a shell of gutta-percha.

15. A playing-ball comprising a hard springy shell, a yielding springy shell within said hard shell, and a filling of liquid within said yielding shell.

Signed at Nos. 9 to 15 Murray street, New York, N. Y., this 17th day of October, 1902.

FRANCIS H. RICHARDS.

Witnesses:
F. W. BARNACLO,
JOHN O. SEIFERT.